July 21, 1970   J. F. JESSE   3,521,098
RELUCTANCE SYNCHRONOUS MOTOR
Filed Oct. 16, 1968
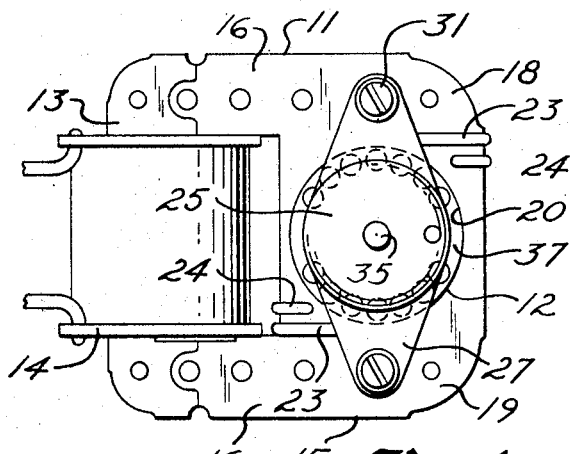
Fig. 1
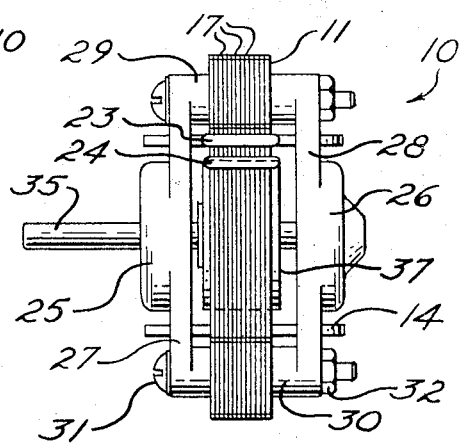
Fig. 2
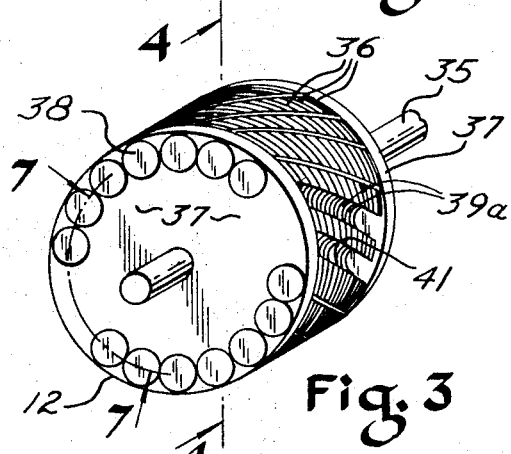
Fig. 3
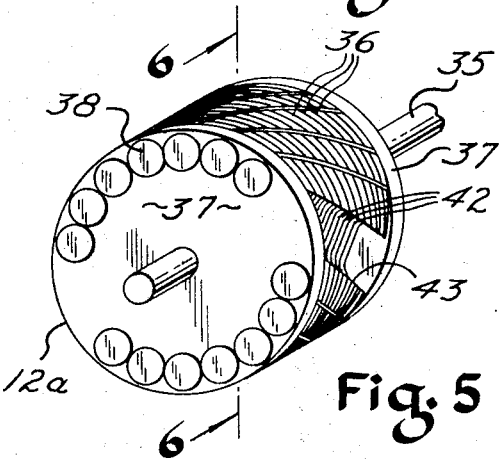
Fig. 5
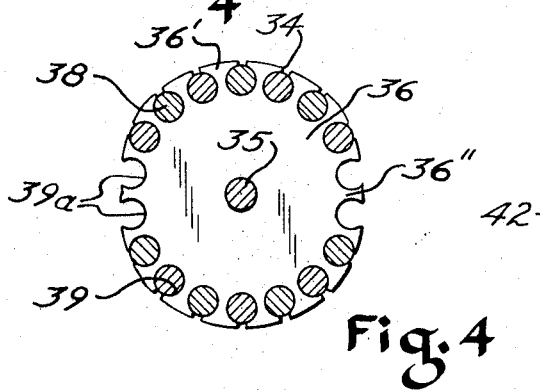
Fig. 4
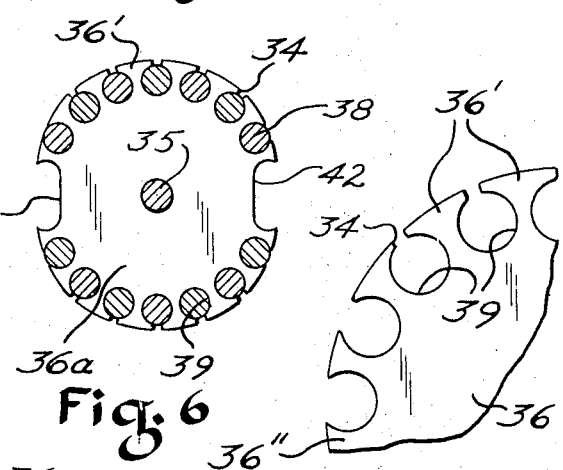
Fig. 6
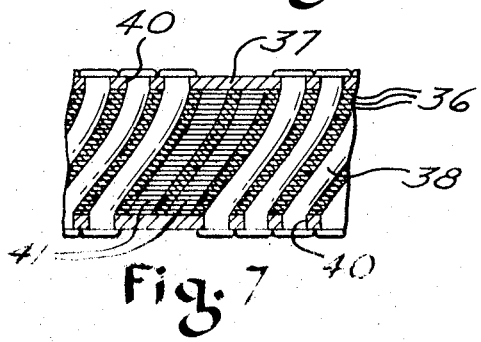
Fig. 7
Fig. 8
INVENTOR.
John Fred Jesse
BY
J. H. SLOUGH
ATTORNEY United States Patent Office 3,521,098
Patented July 21, 1970

3,521,098
RELUCTANCE SYNCHRONOUS MOTOR
John Fred Jesse, Grafton, Ohio, assignor to The General Industries Company, Elyria, Ohio, a corporation of Ohio
Filed Oct. 16, 1968, Ser. No. 768,001
Int. Cl. H02k 19/00
U.S. Cl. 310—163                                    6 Claims

ABSTRACT OF THE DISCLOSURE

A squirrel cage rotor for a synchronous electric motor is provided with oblong shaped laminations between end plates, and the laminations and plates are connected by annularly disposed conductor bars. Certain of the bars are eliminated adjacent to the flattened sides of the laminations, and the laminations are progressively skewed in an axial direction.

This invention relates to a reluctance synchronous motor and an improved rotor construction therefor.

The motor of the present invention comprises a stator of a known type and a squirrel cage rotor having a multiplicity of stacked laminations disposed between end plates and connected by a plurality of bars disposed through the laminations and end plates adjacent to the periphery of the rotor. The laminations are progressively skewed with respect to each other in an axial direction, the bars being correspondingly helically shaped to conform to the skewing. Certain of the bars are eliminated and lateral edge portions of the laminations are flattened whereby the central portion of the rotor between the end plates is of oblong shape in transverse section.

An object of the present invention is to provide a reluctance synchronous motor having improved starting torque with respect to similar motors with which the inventor is familiar.

Another object of the invention is to provide such a motor wherein the pull-in or transition from asynchronous to synchronous speed is improved without materially affecting performance at synchronous speed.

Still another object is to provide a motor having the above characteristics wherein the added spacing at the lateral edge portions of the laminations tends to cool the stator and rotor.

Yet another object is to provide an improved rotor as set forth above which is adaptable for use with any type of alternating current stator.

Another object of the invention is to provide an improved synchronous rotor which can be readily assembled by means of automation equipment.

Other objects of the invention and the invention itself will be readily apparent from the following description of the invention and the accompanying drawings, in which said drawings:

FIG. 1 is a side elevation of a two-pole motor constructed according to the present invention;

FIG. 2 is an end view as seen from the right-hand end of the motor of FIG. 1;

FIG. 3 is an isometric view of the motor rotor according to a first form of the invention;

FIG. 4 is a transverse section taken along the line 4—4 of FIG. 3 showing a first form of rotor lamination in plan view;

FIG. 5 is an isometric view of a rotor according to a second form of the invention;

FIG. 6 is a transverse section taken along the line 6—6 of FIG. 5 showing a second form of rotor lamination in plan view;

FIG. 7 is a section taken along the line 7—7 of FIG. 3; and

FIG. 8 is an enlarged fragmentary view of an edge portion of the rotor lamination of FIG. 4.

Referring now to the drawings in all of which like parts are designated by like reference characters, the present invention is shown as applied to a two-pole shaded pole motor generally indicated at 10 comprising a laminated stator or field member 11 and a squirrel cage type rotor 12. The stator member 11 includes a yoke section 13 having a single stator coil 14 telescoped thereover and a pole section 15 having arms 16 connected to the ends of the yoke section 13 on either side of the winding 14.

The laminations of the stator pole section 15, indicated at 17 in FIG. 2, are cut or stamped to provide two annularly spaced stator poles 18 and 19 and an opening 20 for receiving the rotor 12. The stator poles 18 and 19 as herein illustrated are provided with suitable shading rings or coils 23 and 24. It will be understood that the stator member herein illustrated is of a conventional type and that other stator members of known construction, shaded or unshaded, may be used.

As shown in FIG. 2, the rotor 12 is mounted in a pair of bearings 25 and 26 carried by mounting plates 27 and 28, respectively, on either side of the stator member 11. The bearing 25 is spaced from the stator member 11 by small tubular spacer portions 29, and the bearing 26 is similarly spaced from the other side of the said stator member by small tubular spacer portions 30. Bolts 31 project through suitable apertures in the ends of the mounting plates 27 and 28, the spacer portions 29 and 30, and suitable apertures in the laminations 17 and are provided with securing nuts 32 whereby said bearings are mounted securely on either side of the stator member coaxially with the axis of the rotor opening 20.

The rotor 12 comprises a rotor shaft 35 having a plurality of coaxial, stamped laminations 36 of magnetic material mounted thereon between a pair of end plates 37 as will be understood by those skilled in the art. As shown in FIG. 4, the laminations 36 are preferably oblong in shape, the upper and lower halves thereof being formed about radii which are smaller than the radius of the rotor as a whole whereby said laminations are effectively flattened at diametrically opposite portions of their peripheries to provide a pair of salient poles for the rotor. Said laminations as well as the end plates 37 are connected together by circumferentially spaced electrically conducting bars 38 projecting through openings 39 in said laminations and openings 40 in the end plates 37. The openings 39 and 40 are arranged symmetrically about the axis of the rotor. The openings 39 open outwardly at the outer peripheries of the laminations by means of narrow slots 34, thus providing T-shaped teeth 36' between the openings, as detailed in FIG. 8. No bars are provided at pairs of the openings 39 disposed at the sides of the laminations which are cut back or flattened to give said laminations their oblong shape. These empty openings are indicated at 39a in FIGS. 2–4. It will be noted that because the openings 39 and 39a are equally spaced on a uniform radius with respect to the rotor axis and the laminations are flattened at the sides, the openings 39a afford open notches of substantial size at the peripheries of said laminations. Relatively short and reduced edge teeth 36" are thus provided adjacent to the openings 39a.

As shown in FIGS. 3 and 7, the laminations 36 are progressively skewed with respect to each other in an axial direction along the shaft 35 whereby the bars 38 are helically formed or twisted to conform to the skewing of the laminations. The resultant construction provides a rotor having pairs of diametrically opposed grooves 41 at opposite sides of the rotor, said grooves being provided by the progressively skewed openings 39a and being generally helical in form with respect to the axis of the rotor shaft 35.

A modified rotor 12a of FIGS. 5 and 6, wherein those parts identical with like parts in the first embodiment are provided with like reference numerals differs from the first embodiment in that openings of the type shown at 39a of the first embodiment are joined at each side of the laminations by removing the teeth 36" between said openings to provide elongated edge cutouts 42. As shown in FIG. 5, the laminations 36a are skewed along the axis of the shaft 35 in the same manner as in the first embodiment whereby the cutouts 42 afford generally helically directed, enlarged grooves 43 at the sides of the rotor as shown in FIG. 5.

The magnetic materials of the stator and rotor may be any of those commonly known to those skilled in the art such as steel, nickel, iron, or the like. The bars 38 are electrically conductive and may be made of copper, aluminum, zinc, silver, or the like. A preferred form would be a copper or die cast aluminum cage. The end plates 37 are preferably made of the same material as the bars but may be made of other suitable material.

Applicant has found that with the construction of the present invention wherein the bars 38 are spaced apart a substantially greater annular distance between the rotor poles by eliminating certain bars and wherein edge portions of the laminations are reduced in the same area, better starting torque is achieved. He has also found that whereas performance of the motor at synchonous speed is not materially affected, the transition from asynchronous to synchronous speed is greatly improved. It has been further found that a motor constructed as set forth herein runs cooler than similar motors not so modified. Although the present invention has been illustrated and described in connection with a two-pole motor, it will be readily understood that the principles of the invention could be applied to motors having a greater number of poles.

What I claim is:

1. A reluctance synchronous motor comprising a field member having a plurality of annularly spaced stator poles defining a rotor opening; a rotor mounted for rotation within said rotor opening; said rotor comprising a rotor shaft; a pair of axially spaced end plates coaxially mounted upon said shaft; a plurality of stacked rotor laminations mounted coaxially upon said shaft between said end plates; said end plates and laminations having a plurality of openings symmetrically spaced around the axis of said shaft adjacent to the peripheries of said end plates and laminations; conductor bars projecting through certain of said openings and connecting said end plates and laminations together; certain of said openings being empty and the peripheral edges of said laminations adjacent to said empty openings being flattened to provide salient poles for said rotor.

2. A motor as set forth in claim 1: there being at least two empty openings at each flattened portion of said laminations.

3. A motor as set forth in claim 2: said empty openings comprising notches opening at the flattened edge portions of said laminations; said laminations being progressively skewed along the axis of said shaft whereby said notches provide helical grooves in the outer periphery of said rotor.

4. A motor as set forth in claim 2: the material of said laminations between said empty openings being cut away to provide substantially large notches opening at the flattened edge potrions of said laminations; said laminations being progressively skewed along the axis of said shaft whereby said notches provide helical grooves in the outer periphery of said rotor.

5. A rotor as set forth in claim 1: said certain other empty openings comprising at least the extent of two of said conductor bar openings and portions of said laminations between said other openings being removed to provide single, wide empty grooves between said salient poles.

6. A rotor for a synchonous motor, comprising a plurality of coaxial laminations disposed between said end plates; said laminations and said end plates having a plurality of spaced openings adjacent to the peripheries thereof conductor bars projecting through certain of the spaced openings and secured to said end plates; said laminations having a pair of flattened portions at the peripheral edges thereof; said flattened portions being annularly spaced to provide salient poles for said rotor; said flattened portions having annular spaced portions wherein the conductor bars are spaced apart a substantially greater annular distance than the remainder of said conductor bars.

References Cited

UNITED STATES PATENTS

| | | | |
|---|---|---|---|
| 1,949,968 | 3/1934 | Lilja | 310—172 |
| 2,072,894 | 3/1937 | Lilja | 310—163 |
| 2,435,911 | 2/1948 | Van Derwoude | 310—163 |
| 3,052,806 | 9/1962 | Lee | 310—163 |
| 3,113,230 | 12/1963 | Linkous | 310—162 |

WARREN E. RAY, Primary Examiner

R. SKUDY, Assistant Examiner

U.S. Cl. X.R.

310—211, 269